(12) United States Patent
Tutuianu et al.

(10) Patent No.: US 8,799,842 B2
(45) Date of Patent: Aug. 5, 2014

(54) METHOD OF ANALYZING INTERCONNECT FOR GLOBAL CIRCUIT WIRES

(75) Inventors: Bogdan Tutuianu, The Hills, TX (US); George J. Chen, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/608,012

(22) Filed: Sep. 10, 2012

(65) Prior Publication Data

US 2014/0075405 A1 Mar. 13, 2014

(51) Int. Cl.
*G06F 17/50* (2006.01)
(52) U.S. Cl.
USPC .......................................... 716/110
(58) Field of Classification Search
USPC .................................... 716/100, 110
See application file for complete search history.

(56) References Cited

U.S. PATENT DOCUMENTS

| 7,096,174 | B2 | 8/2006 | Beattie et al. | |
| 2007/0226659 | A1* | 9/2007 | Suaya et al. | 716/1 |
| 2008/0028353 | A1* | 1/2008 | Lu et al. | 716/13 |

OTHER PUBLICATIONS

Marques et al.; Generating Compact, Guaranteed Passive Reduced-Order Models of 3-D RLC Interconnects—N.A.—IEEE Transactions on Advanced Packaging, vol. 27, No. 4, Nov. 2004, 569-580.
Yu et al.; Loop-Based Inductance Extraction and Modeling for Multiconductor On-Chip Interconnects—IEEE Transactions on Electron Devices, vol. 53, No. 1, Jan. 2006, 135-145.
M. Tsuk; The Use of Loop Inductance in Signal Integrity Modeling—IEEE 2001, pp. 81-84.
Kopcsay et al.; A Comprehensive 2-D Inductance Modeling Approach for VLSI Interconnects: Frequency-Dependent Extraction and Compact Circuit Model Synthesis—IEEE Transactions on Very Large Scale Integration Systems, vol. 10, No. 6, Dec. 2002, 695-711.
Deutsch et al.; Frequency-Dependent Crosstalk Simulation for On-Chip Interconnections—IEEE Transactions on Advanced Packaging, vol. 22, No. 3, Aug. 1999, 35-38.
Kamon et al.; Interconnect Analysis: From 3-D Structures to Circuit Models—DAC 1999, 910-914.
Beattie et al.; Inductance 101: Modeling and Extraction—DAC 2001, 323-328.
Wendel et al.; POWER7, a Highly Parallel, Scalable Multi-Core High End Server Processor—IEEE Journal of Solid State Circuits, vol. 46, No. 1, Jan. 2011, 145-161.
Huang et al.; Loop-Based Interconnect Modeling and Optimization Approach for Multigigahertz Clock Network Design—IEEE Journal of Solid State Circuits, vol. 38, No. 3, Mar. 2003, 457-463.
Kamon et al.; FASTHENRY: A Multipole-Accelerated 3-D Inductance Extraction Program—IEEE Transactions on Microwave Theory and Techniques, vol. 42, No. 9, Sep. 1994, 1750-1758.
Krauter et al.; Including Inductance Effects in Interconnect Timing Analysis—IEEE Custom Integrated Circuits Conference 1999, 445-452.

\* cited by examiner

*Primary Examiner* — Suchin Parihar
(74) *Attorney, Agent, or Firm* — Kraguljac Law Group, LLC (57) ABSTRACT

Systems, methods, and other embodiments associated with analyzing interconnects for global wires of a circuit are described. In one embodiment, for a target wire in a circuit design, a method includes determining an inductance value and a capacitance value for parallel wires to the target wire. The method then calculates a second capacitance value for non-parallel wires to the target wire and calculates an estimated inductance value for the non-parallel wires based on the second capacitance value. A circuit model for the target wire may then be generated using the inductance and capacitance values.

16 Claims, 6 Drawing Sheets

METHOD OF ANALYZING INTERCONNECT FOR GLOBAL CIRCUIT WIRES

BACKGROUND

Electronic circuit simulation uses mathematical models to replicate the behavior of an actual electronic device or circuit. Simulation software allows for modeling of circuit operation and is an invaluable analysis tool.

Simulating a circuit's behavior before actually building the circuit can greatly improve design efficiency by making faulty designs known and providing insight into the behavior of the circuit. In particular, for integrated circuits, tooling (e.g., photomasks) is expensive and probing the behavior of internal signals is extremely difficult. Therefore almost all integrated circuit design relies heavily on simulation. A well known analog simulator is SPICE (Simulation Program with Integrated Circuit Emphasis).

The high costs of photolithographic masks and other manufacturing prerequisites make it essential to design a circuit to be as close to perfect as possible before the integrated circuit is first built. Simulating the circuit with SPICE is the industry-standard way to verify circuit operation at the transistor level before committing to manufacturing the integrated circuit.

In electronic design automation, parasitic extraction is the calculation of parasitic effects in both the designed devices and the required wiring interconnects of an electronic circuit such as detailed device parameters, parasitic capacitances, parasitic resistances and parasitic inductances, commonly called parasitic devices, parasitic components, or simply parasitics.

The major purpose of parasitic extraction is to create an accurate analog model of the circuit so that detailed simulations can emulate actual digital and analog circuit responses. Digital circuit responses are often used to populate databases for signal delay and loading calculation such as timing analysis, circuit simulation, and signal integrity analysis.

FastCap and FastHenry, from MIT (Massachusetts Institute of Technology), are two parasitics extractor tools for capacitance, inductance and resistance. Another universal parasitics extractor tool is Star-RCXT from Synopsys (previously from Avanti).

As microprocessors increase in speed, clocks that drive them also need to switch at higher and higher frequencies. The clocks need to be distributed across a chip in a uniform fashion so that the skew between any two points is minimized.

To achieve this goal, wide upper level interconnects are used for clock signal distribution. In wide wires, at advanced processes, inductive effects start to dominate (as opposed to resistive effects for typical narrow wires). Unfortunately, it is much more difficult to model/analyze inductive effects than resistive effects.

Using the existing resistive-capacitive (R-C) analysis methodology, the method only modeled the resistivity of a wire and the electric field around the wire (at the coupling of the wire and surrounding neighboring wires). The analysis resulted in signal propagation delay estimates that were very small and non-physical. With such small delays, the R-C analysis concluded that signals were propagating near or above the speed-of-light. These delay estimates are, of course, incorrect. As a result, buffers designed in a circuit tend to be oversized, wasting area and power. In addition, increased inaccuracy may result for these analysis methods if the clock distribution network is not completely symmetric, which it rarely is.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein that provide analysis of inductive effects in circuit designs to improve circuit designs and models. In one embodiment, a computer-implemented method provides an improved analysis of global structures such as global clock interconnect wires to improve designs for area and power of a circuit, and/or improved accuracy for global clock distribution networks. For example, the analysis includes determining estimates of inductive effects of a circuit on a global wire. The estimated inductive effects are then combined with other calculated properties of the global wire to more accurately model the global wire.

The prior R-C analysis did not account for the situation where wires are very long and the propagation of signals along the wires takes more time.

Propagation along long wires creates an additional magnetic field in the circuit that the R-C analysis did not include. The present systems and methods calculate and include the inductance from additional structures (e.g., orthogonal structures) in the circuit to better model a full electromagnetic field and generate an improved model of a target wire.

As will be described herein, integrated circuits are composed of multiple layers of electronic components that are integrated both vertically and horizontally. In some designs, several of the top layers (e.g., layers 12-15) are metal layers that define conductors and make connections between components. Wires in the top layers may be organized in tile arrangements and look like wire meshes or grids (e.g., wires have a consistent geometry). However, in the lower layers (e.g., transistor layers), the wires have random lengths and placements. The present discussion is directed to the top layers of wires because the wires are wider and travel long distances relative to other layers. For example, a wire length of 1 mm is considered long in a chip.

As described herein, a circuit includes simple structures and complex structures where simple structures refer to parallel wires and complex structures refer to orthogonal wires. Some wires are considered global since they are distributed to many portions of the circuit. For example, clock wires (lines) that transmit clock signals at high frequencies throughout the circuit to all components are global clock wires. Because of the high frequency content of clock signals, longer wire lengths, and complex power plane structures of circuits, the typical resistance-capacitance (R-C) circuit models that are extracted separately do not adequately model the dynamic electromagnetic (EM) field propagation of the clock wires.

In advanced process nodes, to accurately model the interconnect of global wires, the present systems and methods include the effect of inductance along with the resistance and capacitance. In one embodiment, a method is described herein to estimate such inductance and provide a more accurate model of global wires.

Figure 1:
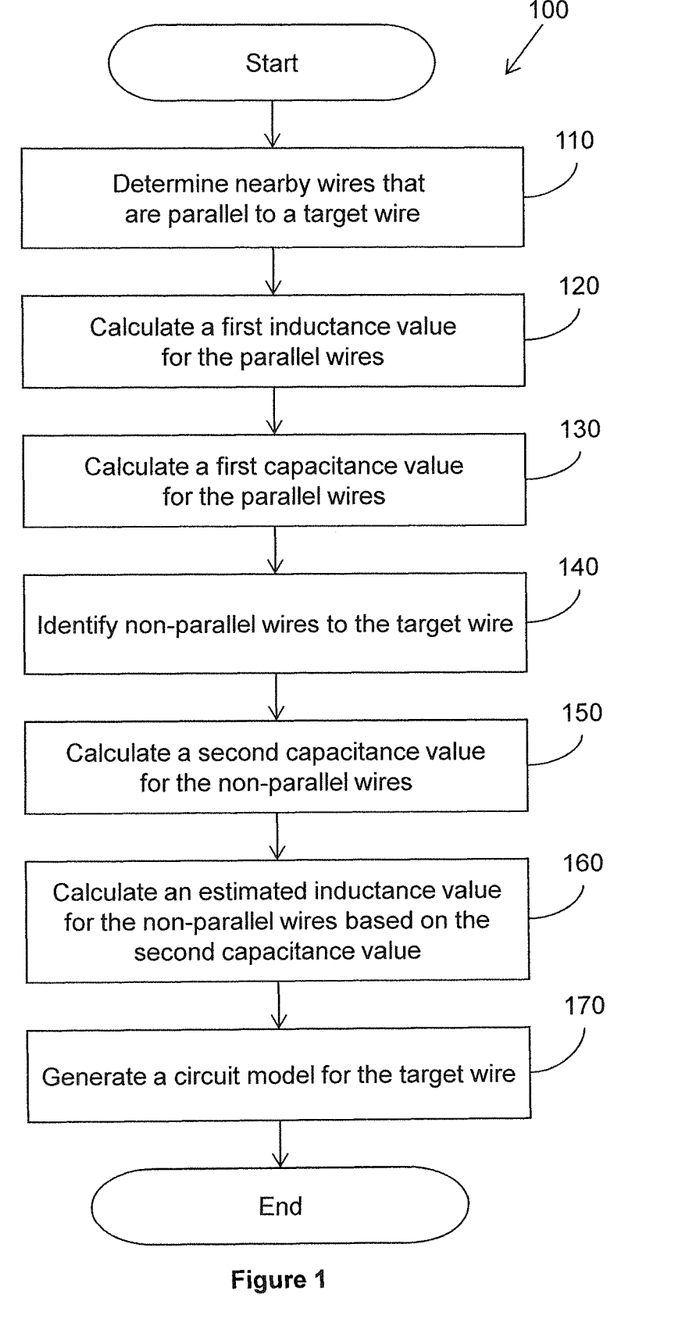
FIG. 1 illustrates one embodiment of a method associated with analyzing a circuit.

With reference to FIG. 1, one embodiment of a computer-implemented method 100 associated with analyzing interconnects for global wires is illustrated. Method 110 is implemented and performed by a computing device configured with a stored analysis algorithm that analyzes computer-implemented circuit designs to model a target wire. In one embodiment, a circuit design is defined in a hardware description language that is read by the analysis algorithm.

FIG. 1 is described with reference to a circuit design that comprises many wires and in particular includes wide interconnects in upper layers of the circuit that are used for clock signal distribution. Method 100 is discussed from an overall perspective and detailed embodiments are discussed in subsequent figures.

In general, global clock lines are wider than other wires. Thus resistance in clock lines is low, which makes it difficult to extract accurate inductance values using prior techniques. Furthermore, prior techniques modeled signal propagation of a wire based on capacitance and resistance, and did not include inductance since it was assumed that the inductance effects were cancelled out by return loops of current. However, with wider and longer wires in complex circuits, the present inventors have found that inductance becomes significant. Thus the present method uses a relationship between capacitance and inductance to estimate the inductance that was previously unaccounted for so that a more accurate inductance value can be added to better model the behavior of a wire.

Method 100 initiates after the analysis algorithm is executed, a circuit design is selected for analysis, and a target wire to be modeled from the circuit design is selected. In this example, the target wire is a global clock wire but can be any structure that propagates signals at high frequencies. In general, the global clock wire is surrounded by many other elements in the circuit (e.g., ground wires, shields, other wires above and/or below the clock wire). Current from the clock wire is assumed to return along one or more possible return paths. Some of the return paths are along parallel wires (wires parallel to the target wire) that define a loop but some return paths are along non-parallel wires that may define a random path and/or one that minimizes the impedance at high frequencies.

At 110, the method determines nearby wires that are parallel wires to the target wire in the circuit design that form a possible current return path. At 120, an inductance value for the parallel wires is calculated (e.g., a first inductance value) and at 130, a capacitance value for the parallel wires is calculated (e.g., a first capacitance value).

Lines parallel to and neighboring the target wire are "obvious" nearby structures that contribute to the inductance of the circuit and can be readily found with an inductance analysis tool (e.g., FastHenry) to compute the inductance value at various frequencies. In one embodiment, this is performed by identifying possible return paths of current from a signal propagated on the target wire that returns on a nearby parallel wire. The method finds capacitance and inductance values for portions of the circuit along the return paths of the parallel wires using existing capacitance and inductance calculation tools.

In one embodiment, the circuit can be divided into sections. For each section where the target wire runs, neighboring wires are determined to identify parallel return paths. The capacitance and inductance is calculated for each section and added to the model.

However with a complex circuit, the circuit does not always have normal parallel circuit loops but has meshes of wires and orthogonal structures (e.g., non-parallel wires) such that normal inductance extraction cannot be accurately performed with prior tools. Thus for non-parallel wires, the calculations are different.

In particular, at 140 in FIG. 1, non-parallel wires to the target wire are identified that define a possible current return path. The non-parallel wires include orthogonal structures that are near the target wire. For the non-parallel wires (e.g., orthogonal wires), a capacitance value is calculated (second capacitance value) at 150, which is readily found with capacitance analysis tools (e.g., StarRC). However, an estimated inductance value for the return path along the non-parallel wires is calculated based on the second capacitance value rather than directly extracting a value using FastHenry. The inductance value is determined using a relationship that exists between capacitance C and inductance L, which is described in more detail below. In one embodiment, the estimated inductance is determined based on the capacitance multiplied by a scaling factor. In one example, the scaling factor is found by performing experiments with various frequencies and comparing inductance values (see Table 1 below).

Once the values are determined, at 170, a circuit model for the target wire is generated by combining the first inductance value (from the parallel wires), the first capacitance value (from the parallel wires), the second capacitance value (from the non-parallel wires), and the estimated inductance value (from the non-parallel wires) along with a resistance value for the target wire, which is readily found with existing techniques.

The method 100 can be repeated for each additional possible current return path in the circuit that is involved with the target wire to produce additional inductance-capacitance values that are added to the model. In one embodiment, the generated model is a RLC model of the target wire, which an example is shown in FIG. 2.

Figure 2:
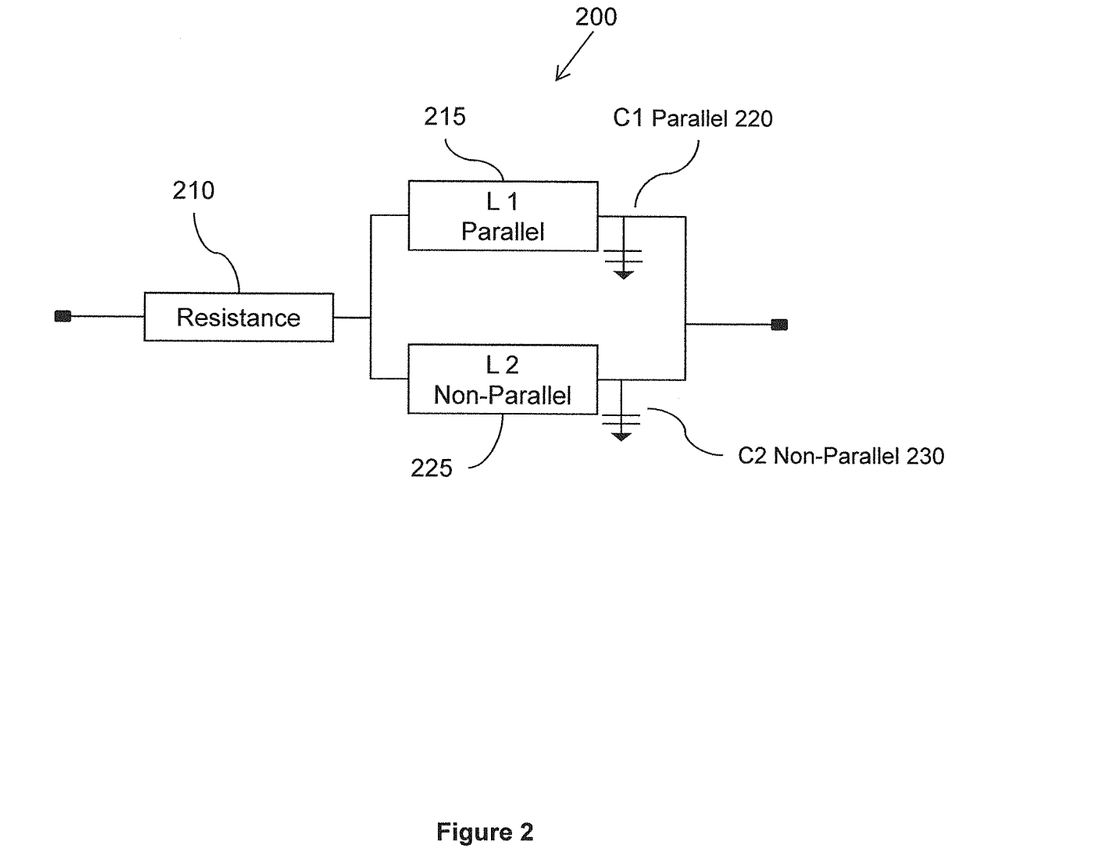
FIG. 2 illustrates one embodiment of an RLC model of a target wire using the method of FIG. 1.

With reference to FIG. 2, one embodiment of a resistance-inductance-capacitance (RLC) model 200 is shown with the values determined from method 100 of FIG. 1. The RLC model 200 includes resistance 210 of the target wire. L1 parallel 215 represents the first inductance value calculated from the parallel wires (block 120 in FIG. 1) and C1 parallel 220 represents the first capacitance value calculated from the parallel wires (block 130 in FIG. 1). L1 and C1 represent the extracted inductance and capacitance values of an individual current return loop in the circuit.

L2 non-parallel 225 represents the estimated inductance value calculated from the non-parallel wires (block 160 in FIG. 1) and C2 non-parallel 230 represents the capacitance value calculated from the non-parallel wires (block 150 in FIG. 1). L2 and C2 represent an individual return loop inductance and capacitance extracted values from method 100 where the return loop travels along orthogonal wires.

With reference to FIGS. 3a-d, a more detailed embodiment of the calculations performed in FIG. 1 is explained in conjunction with example portions of a circuit. The example portions include components from a first layer 300 of a circuit (e.g., layer 12 from an M12 tile) and a second layer 305 (e.g., layer 13 from an M13 tile) that is on top. A clock line 310 is in the M12 layer 300. Wires surrounding the clock line 310 in M12 tile 300 are all labeled as wires 325 since their specific type is not relevant to this discussion. M12 tile 300 also includes a shield 330 adjacent the clock line 310. Wires on the M13 tile layer 305 include wider wires 315 that are parallel to the clock line 310 and orthogonal structures 320 (e.g., straps 320).

Figure 3A:
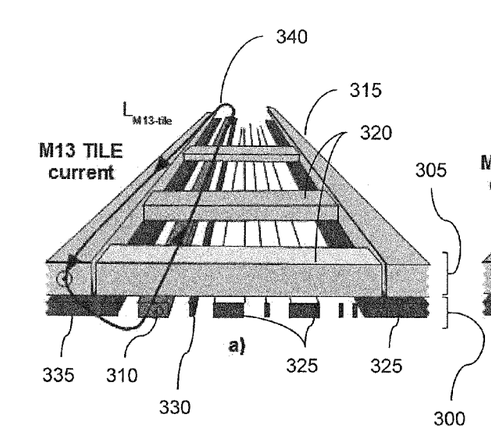
FIGS. 3a-d illustrate portions of two tile layers of a circuit and possible current return paths for a clock line.
Figure 3B:
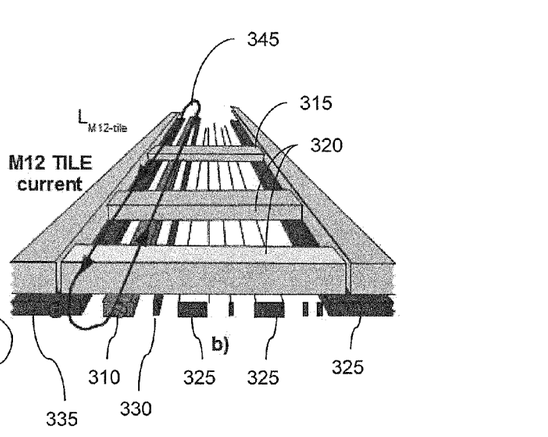
Figure 3C:
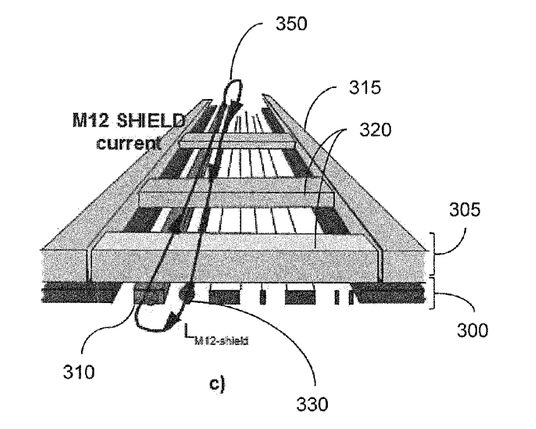

FIG. 3a shows an example return path 340 for current from the clock line 310 that propagates along the clock line 310 and loops back along the M13 tile along a parallel wire that is the closest edge of the M13 tile to the clock line 310 (M13 Tile Current). FIG. 3b shows an example return path 345 for current from the clock line 310 that propagates along the clock line 310 and loops back along the M12 tile along a parallel wire 335 that is the closest edge of the M12 tile (M12 Tile Current). FIG. 3c shows an example return path 350 for current from the clock line 310 that propagates along the clock line 310 and loops back along the M12 tile along the closest shield (e.g., shield 330) (M12 Shield Current). Return paths 340, 345, and 350 are defined from what can be referred to as "obvious" structures: parallel wires that conduct current next to (neighboring) the target wire 310.

Figure 3D:
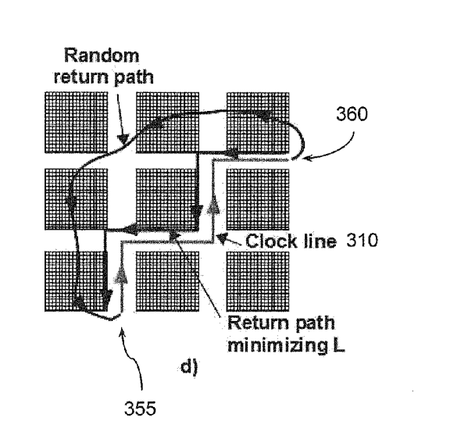

FIG. 3d shows nine tiles/grids of wires and the clock line 310 running from point 355 to point 360. Two possible current return paths are shown: (1) a random return path, and (2) a return path that minimizes inductance L by running along the edges of the tiles. If the current returns on structures that are perpendicular (orthogonal) to the clock line 310, such as on orthogonal straps 320, inductance is created because the orthogonal straps 320 are thick and create a shield above the clock line 310. Previous analysis models assumed there was no inductance from such orthogonal structures. Such a return path is defined from "non-obvious" structures that are orthogonal and/or unknown structures (under the target), which may create a significant amount of inductance (e.g., 50%). Thus, adding an estimated inductance value from these non-parallel structures is more than a minor correction to the previous RLC model but may be a significant adjustment.

The following is one embodiment of modeling the clock line 310 by including the effects of inductance from non-parallel wires as mentioned in FIG. 1. The inductance is computed based on the return paths of the static currents. In FIGS. 3a-d, the same M12 wire profile is shown in perspective, with the main current paths labeled as 340, 345, and 350. The current is distributed such that its return path minimizes the loop impedance, real (resistance) and imaginary (inductance) part. In the case of the M12 clock line 310, the closest distinct return paths are the paths through the closest edges of the tiles (FIGS. 3a and 3b) and of the closest shields (FIG. 3c). At a global level, the current will not choose a random return path through the power tiles because that will result in a loop area that is larger than the return path that follows the edges of the tiles along the clock line 310 (FIG. 3d).

One issue is that some of the return paths do not have any significant capacitive coupling, while others have very significant capacitive coupling. For example, the strongest coupling to the M13 tile zippers (not shown) does not have any significant return path parallel to the clock line 310 because the zippers are not continuously connected. There is current flowing through the zippers to the tiles but it is orthogonal to the direction of the clock current. Because the EM dynamic field propagation cannot occur with only one component (E modeled by C, or H modeled by L), it is determined that the prior modeling technique is incomplete and that the prior approach that splits the C extraction from the L extraction is wrong. In fact the capacitance extraction, even in 3D, is based on transverse electrostatic field assumption while the inductance extraction is based on a static magnetic field assumption. Thus in one embodiment, method 100 is configured to model the EM dynamic propagation by performing a concurrent 3D extraction and modeling of R, L and C.

To have a better estimate of the overall effective inductance, method 100 looks at how much loop inductance each of the three return paths 340, 345, 350 identified in FIGS. 3a-c has. In separate runs, FastHenry (or other inductance extraction tool) is used to extract the loop inductance within the frequency range of interest as well as at very high frequencies. StarRC is used to extract the individual capacitance between the clock line 310 and the tile edges, the shield 330 and the zippers. The clock line 310 current is assumed to return through these three paths 340, 345, 350 simultaneously so an equivalent circuit model can be constructed, as shown in FIG. 4.

Figure 4:
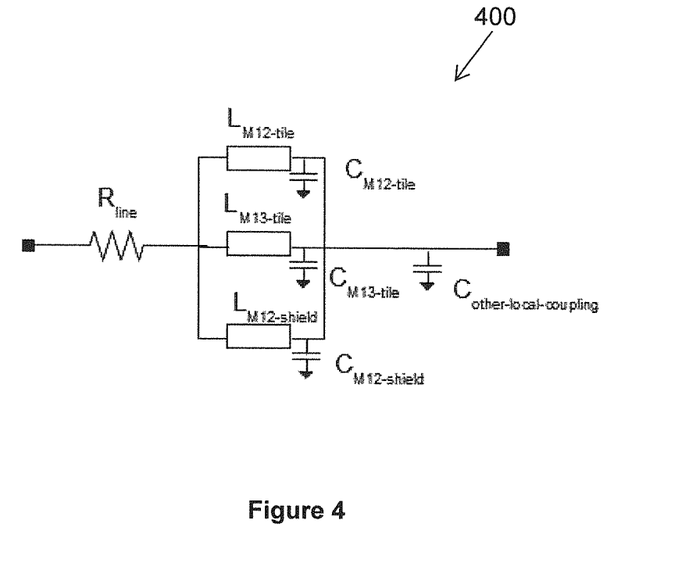
FIG. 4 illustrates one embodiment of an RLC model of the clock line from FIGS. 3a-d.

FIG. 4 shows one embodiment of an RLC model 400 of the clock line 310 that includes the individual loop inductance and capacitance extracted values from the three return paths 340, 345, and 350. As seen in the model 400, L-C for M12-Tile represents the return path 345, L-C for M13-Tile represents the return path 340, and L-C for M12 Shield represent return path 350. These represent calculations referred to as L and C for parallel lines as described in method 100 of FIG. 1 since the return paths are along lines parallel to the target clock line 310.

Model 400 also includes a capacitance value "C other-local-coupling" that represents the capacitance extracted from unknown/other structures along the non-parallel return loop of FIG. 3d, which is readily found as in block 150 of FIG. 1. What remains is the estimated inductance for the non-parallel return loop (e.g., FIG. 3d).

The inductance estimation for orthogonal wires can be improved with an analysis of the current return paths and with infinite frequency-based inductance estimation. The individual component values are shown in Table 1 for the length of 100 microns of clock line 310:

TABLE 1

| Return Path | Inductance at 10 GHz | Inductance at infinite frequency | Scaling between L @ 10 GHz and L @ infinite frequency |
| --- | --- | --- | --- |
| M12 tile | 1.2878e–10H | 1.00156–10H | 1.28 |
| M13 tile | 1.6343e–10H | 1.4037e–10H | 1.16 |
| M12-shield | 1.5070e–10H | 1.24016–10H | 1.21 |
| Total parallel: | 0.48733e–10H | 0.3973e–10H | 1.23 |

Three return paths are used (from FIGS. 3a-c) and the inductance is determined at a first frequency (10 GHz) and at a selected second frequency (referred to as infinite frequency, which is explained below). A scaling factor between the two values is calculated. A table of scaling factors can be generated and stored in a memory. In one embodiment, the individual loop inductors are placed in parallel because at every point along the clock line the voltage drop associated with each return path current component should be the same. The value computed for the inductance at infinite frequency on the existing return paths is 3.97e−11 H which is smaller than but still very close to the 4.57e−11 H computed using FastHenry and the entire power structures. This model (L known from shield and tile only) is an improvement over the FastHenry model but will still generate comparable signals. It is observed that the scaling factor between the 10 GHz inductance and the infinite frequency inductance is fairly similar, which is around 1.2. This can be used as an average value that is applied in calculations.

Of course, it will be appreciated that based on specific measurements or observations from comparing inductance values and frequencies for different types of return paths in a different type of circuit, a different scaling factor may apply for other circuits.

In one embodiment, the term infinite frequency is described with the following considerations. There are three components used to model the wires: resistance, inductance and capacitance. The components together model the impedance (the overall opposition of the wire to allowing current to pass through it). The impedance due to resistance does not change with frequency. The impedance due to inductance grows linearly with frequency and the impedance due to capacitance decreases with frequency. At some frequency, the impedance due to inductance will get larger than the impedance due to resistance. And as the frequency gets higher, the effect of the resistance on the impedance becomes smaller and smaller. The "infinite frequency" is a very high frequency where the resistance effect is millions of times smaller than the inductance effect, and the chosen value of 1.0e+18 Hz is such a frequency as used in Table 1. The normal operating frequencies of present day circuits are around 1 GHZ=1.0e+9 so this "infinite frequency" is a billion times higher than the operating frequency and a million times higher than the frequency of light.

The point of using this "infinite frequency" in the present approach is that at such very high frequency values the impact of resistance on the impedance is, from an engineering point of view, imperceptible. At such high frequencies only inductance and capacitance remain to play a role in estimating the impedance. From an engineering point of view, any frequency value where the impact of resistance becomes insignificant would serve equally well as the "infinite frequency." In one embodiment, the infinite frequency is considered to be where the effect of resistance is less than 1.0e−4% (e.g. its impact is not seen within the first 6 decimal places). With this, an infinite frequency of 1.0e+18 Hz is a very conservative high value. Of course, other high frequency values may be selected when calculating the scaling factor in Table 1 that satisfy these considerations.

Returning to the discussion of Table 1, the coupling capacitance largest contributor is the coupling to the M13 zippers. At very high frequencies, the capacitance between the zippers act as a zero impedance connection and the EM field propagates along the clock line as if the zippers are fully connected. The inductance of this "loop" can be determined using equation 1:

$$L_{line}^{\infty} = \frac{\epsilon_0 \cdot \epsilon_r \cdot \mu_0 \cdot d^2}{C_{line}}$$ Equation (1)

where L is the inductance at infinite frequency; C is the capacitance; $\epsilon_0$ is the permittivity of free space; $\epsilon_r$ is relative permittivity of the insulating material; $\mu_0$ is permeability of free space; and $d^2$ is the distance (length) of the line in meters.

Equation 1 is derived from equation 2:

$$L_{line} \cdot C_{line} = \epsilon_0 \cdot \epsilon_r \cdot \epsilon \mu_0 \cdot d^2$$ Equation (2)

Equation 2 comes from the transmission line theory that states that at very high frequencies (e.g. $10^{18}$ Hz), the inductance effects fully dominate any resistive effects and capacitance impedance is almost 0 so the wire structure behaves closely to an ideal transmission line and the characteristic line inductance and line capacitance satisfy an inversely proportional relation.

Referring back to equation (1), for the clock signal range of frequencies, the capacitors between the zippers do not act as a short circuit but the zippers are connected to the high voltage and ground tiles and their charging and discharging occurs and is accompanied by an effective inductance. In one embodiment, one way to estimate this inductance is to compute the infinite frequency inductance which is associated to the coupling capacitance to the zippers and scale the infinite frequency inductance value with the scaling factor 1.2 seen in Table 1 for all other loops. The same approach can be used for any other capacitance. For a $C_{other-local-coupling}$=17.7487e−15 F (per 100 microns of clock line), the associated inductance at infinite frequency is:

$$L_{other-local-coupling}^{\infty} = 1.56648e-11 \text{ H}$$

which multiplied by the scaling factor 1.2 gives the estimated remaining inductance:

$$L_{other-local-coupling} = L_{other-local-coupling}^{\infty} \cdot 1.2 = 1.56648e-11 \text{ H} \cdot 1.2 = 1.8798e-11 \text{ H}$$

Figure 5:
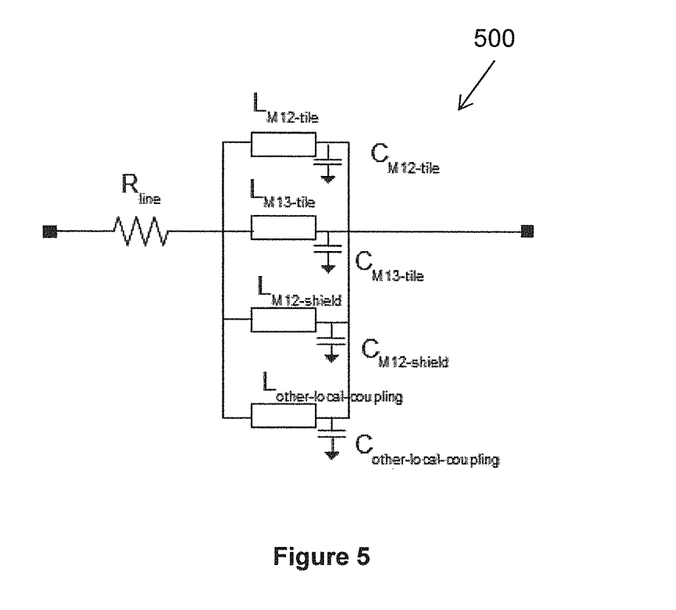
FIG. 5 illustrates another embodiment of an RLC model of the clock line from FIGS. 3a-d that includes inductance from unknown structures.

The final estimated model of the clock line 310 is shown in FIG. 5, which shows an RLC model 500 of the clock line 310 including an estimate of inductance "L other-local-coupling" as a counterpart to capacitance "C other-local-coupling." This L-C for other-local-couplings corresponds to the L-C for non-parallel wires as found in FIG. 2, elements 225 and 230. The RLC model 500 can then be input to a circuit simulator to simulate the behavior of the clock line 310 for purposes of observing its performance and assist with re-designs.

Figure 6:
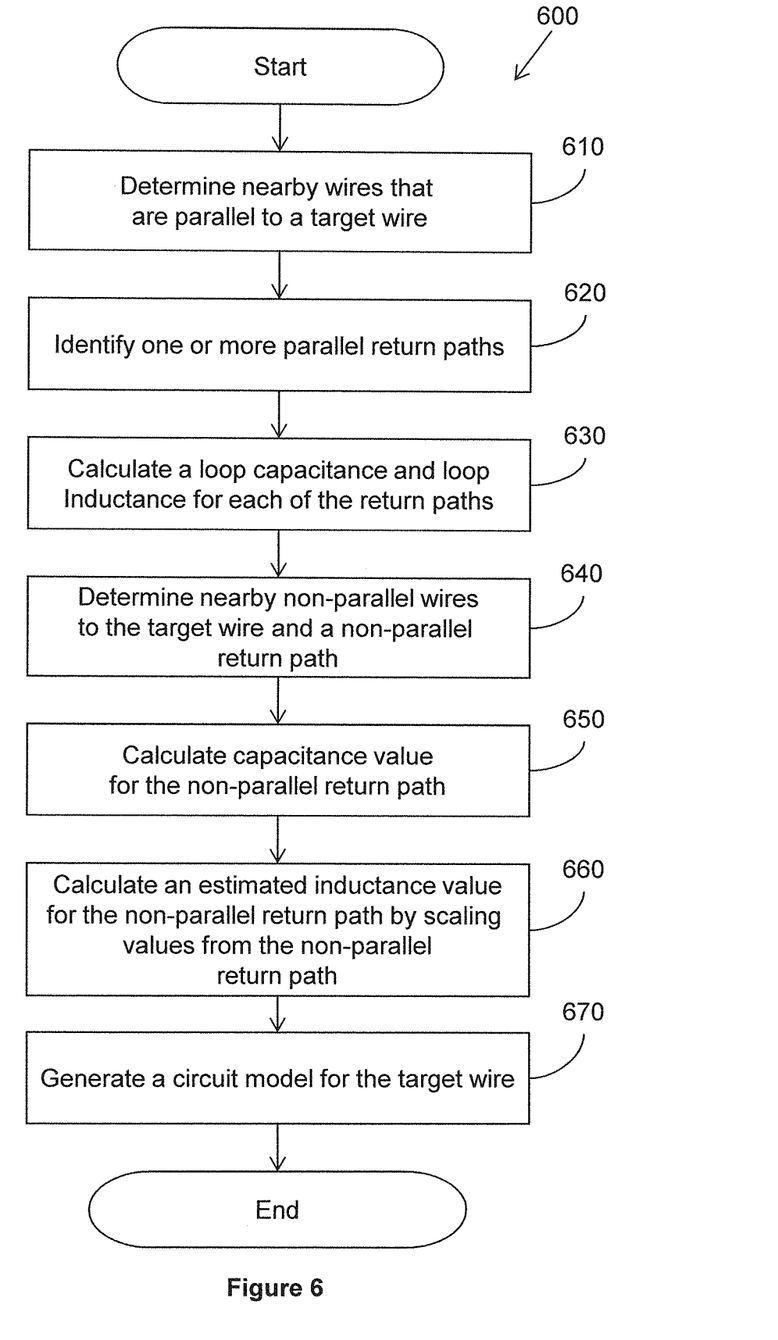
FIG. 6 illustrates another embodiment of a method associated with analyzing a circuit.

With reference to FIG. 6, another embodiment of a computer-implemented method 600 is illustrated associated with analyzing a target wire in a circuit. Method 600 is based on the previous discussions and based on the context set forth as explained under FIGS. 1 and 3. At 610, for a target wire in a circuit design, nearby wires are determined that are parallel wires to the target wire. At 620, one or more parallel return paths for current from the target wire are identified that forms a loop through the circuit design over one of the nearby parallel wires. At 630, loop inductance and loop capacitance is calculated for each of the one or more parallel return paths. As explained previously, these values are easily found since they involve loops of parallel wires.

At 640, wires near the target wire are determined that are non-parallel wires to the target wire. At 650, a non-parallel return path for current from the target wire is determined that forms a loop through the circuit design over one or more of the non-parallel wires. This loop includes structures that are orthogonal to the target wire. At 660, a capacitance value is calculated for the non-parallel return path using capacitance analysis tools. At 670, an estimated inductance value for the non-parallel return path is calculated by scaling the inductance at infinite frequency, computed based on equation 1 using the capacitance value for the non-parallel return path, with a scaling factor. As previously discussed, the actual inductance value for the non-parallel return path is unknown and very difficult to directly measure. Thus, the method 600 uses a pre-determined relationship between capacitance and inductance to obtain a scaling factor as explained with reference to FIGS. 3a-d. The estimated inductance value can then be used to represent the previously unknown inductance created by orthogonal structures in the circuit.

At 670, a circuit model of the target wire is generated that includes the loop inductance and the loop capacitance for each of the parallel return paths combined with the capacitance value for the non-parallel return path and the estimated inductance value from the non-parallel return path.

Computer Embodiment

Figure 7:
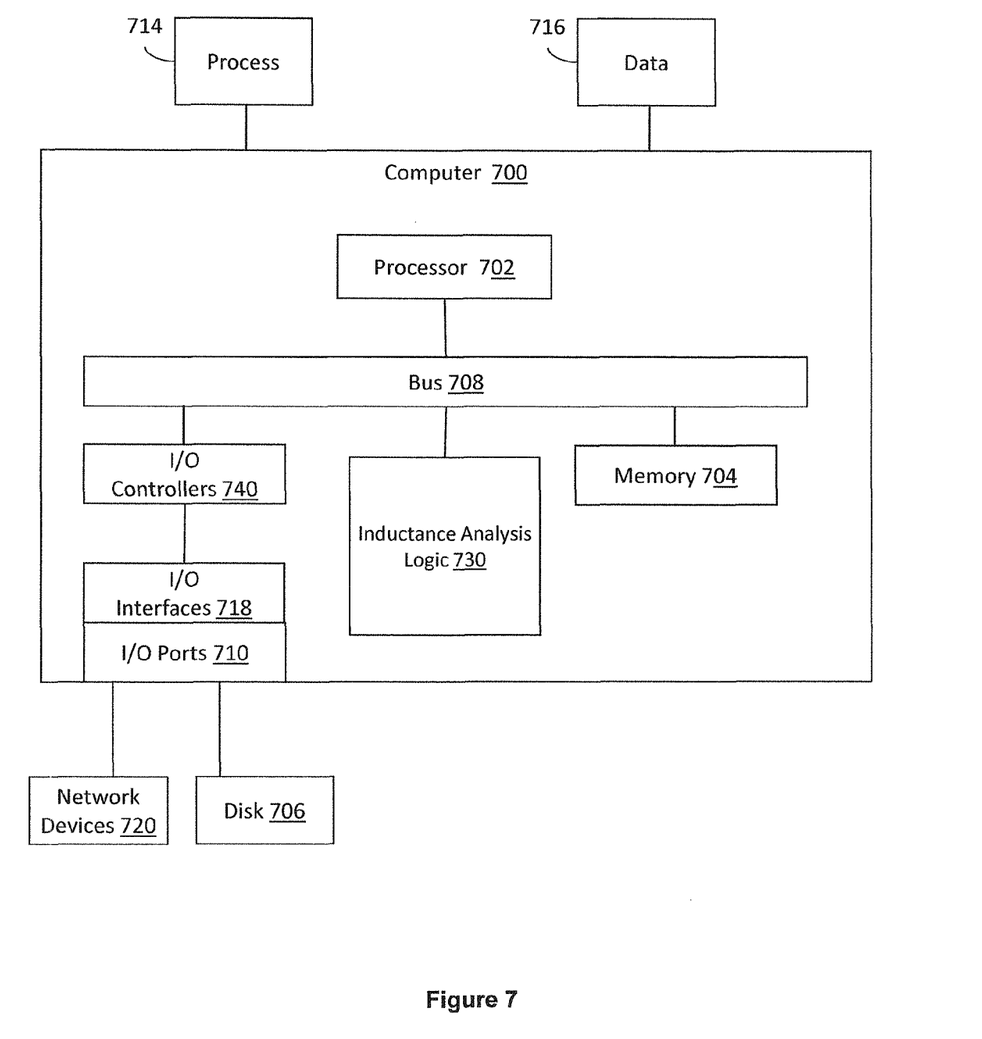
FIG. 7 illustrates an embodiment of a computing system in which example systems and methods, and equivalents, are implemented.

FIG. 7 illustrates an example computing device in which example systems and methods described herein, and equivalents, may operate. The example computing device may be a computer 700 that includes a processor 702, a memory 704, and input/output ports 710 operably connected by a bus 708. The computer 700 includes inductance analysis logic 730 configured to facilitate method 100 of FIG. 1, method 500 of FIG. 5, and/or other functions discussed with reference to the other figures. In different embodiments, the logic 730 may be implemented in at least hardware and may include a non-transitory computer-readable medium with stored instructions, firmware, and/or combinations thereof. While the logic 730 is illustrated as a hardware component, it is to be appreciated that in one example, the logic 730 could be implemented in the processor 702 that is programmed with a stored algorithm.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

Definitions

FastHenry inductance extraction is performed on complex wire structures by assuming that the structures are electrically driven from a set of ports. Each port represents the entry and exit point of a current (e.g., generated by a 1V voltage source) which flows through all the wire shapes electrically connected to the port. To generalize, each port defines a current loop and, if needed, a user can define several ports and FastHenry computes the self-impedance of each loop as well as the voltage drop induced by each current loop on every other current loop. The "loop" should be understood in a general sense, for example the near and far end points of the clock wire 310 (e.g., point 355 and 360 in FIG. 3d) are the two pins of a port which form a current loop with its voltage source. The ports also represent the electrical connection points between this circuit structure and others. In one embodiment, the circuit set-up only accounts for the electrical activity of about 500 um long clock wire (drawn) but a typical clock wire that is 2 mm long (drawn) would use 4 such models connected. The ports represent the points where the most likely direct and return current paths are connected. For the power tiles, the connection points have been chosen to be on the edge of the tile edge that is closest to the clock line.

In some embodiments, the described methods and/or their equivalents may be implemented with computer executable instructions as an algorithm that controls a computer. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
RAM: random access memory.
ROM: read only memory.
"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Forms of a computer-readable medium may include, but are not limited to, a flexible disk, a hard disk, other magnetic medium, an ASIC, a CD, other optical medium, a RAM, a ROM, a memory chip or card, a memory stick, and other media from which a computer, a processor or other electronic device can read.

"Logic", as used herein, includes hardware, firmware, a non-transitory computer readable medium that stores instructions that implement the described algorithm(s), and/or combinations of each to perform a function(s) or an action(s), and/or to cause a function or action from another logic, method, and/or system. Logic may include a microprocessor programmed with instructions, specific logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one logic unit/component. Similarly, where a single logic unit is described, it may be possible to distribute that single logic between multiple logic units/components.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer that includes a processor cause the computer to perform a method, the method comprising:
for a target wire in a circuit design that comprises a plurality of wires:
determining, using at least the processor, nearby wires that are parallel wires to the target wire in the circuit design, the determining including:
calculating, using at least the processor, a first inductance value for the parallel wires;
calculating, using at least the processor, a first capacitance value for the parallel wires;
identifying non-parallel wires to the target wire, the identifying including:
calculating, using the processor, a second capacitance value for the non-parallel wires;
calculating, using the processor, an estimated inductance value for the non-parallel wires based on the second capacitance value; and
generating, using the processor, a circuit model for the target wire by combining the first inductance value, the first capacitance value, the second capacitance value, and the estimated inductance value.

2. The non-transitory computer-readable medium of claim 1, further comprising selecting the target wire that is a global clock wire.

3. The non-transitory computer-readable medium of claim 1, wherein calculating the estimated inductance value for the non-parallel wires based on the second capacitance value comprises determining an inductance value at infinite frequency based on at least the second capacitance value and multiplying the inductance value at infinite frequency with a scaling factor;
wherein the infinite frequency is a frequency value where an impact of resistance on impedance becomes insignificant in relation to an impact of inductance and capacitance on the impedance.

4. The non-transitory computer-readable medium of claim 1, wherein determining nearby wires that are parallel wires further includes:
identifying one or more return paths for current from the target wire that forms a loop through the circuit design;
calculating loop inductance and loop capacitance for each of the one or more return paths; and
wherein generating the circuit model for the target wire comprises:
generating a resistance-inductance-capacitance (RLC) model of the target wire that includes the loop inductance and the loop capacitance for each of the return paths combined with the second capacitance value and the estimated inductance value from the non-parallel wires.

5. The non-transitory computer-readable medium of claim 1, further comprising:
identifying one or more return paths for current from the target wire that forms a loop through the circuit design;
calculating a loop inductance value for each return path at a first frequency that is based on an operating frequency of the target wire and at a second frequency wherein the second frequency is a frequency value where an impact of resistance on impedance is insignificant;
generating scaling factors between the loop inductance values at the first frequency and the loop inductance values at the second frequency; and
storing the scaling factors in a storage device.

6. The non-transitory computer-readable medium of claim 1, wherein generating the circuit model for the target wire comprises generating a resistance-inductance-capacitance model that represents a behavior of the target wire.

7. A non-transitory computer-readable medium storing computer-executable instructions that when executed by a computer that includes a processor cause the computer to perform a method, the method comprising:
for a target wire in a circuit design that comprises a plurality of wires, determining nearby wires that are parallel wires to the target wire, the determining including:
identifying, using at least the processor, one or more parallel return paths for current from the target wire that forms a loop through the circuit design over one of the nearby parallel wires;

calculating, using at least the processor, loop inductance and loop capacitance for each of the one or more return paths; and determining, using at least the processor, nearby wires that are non-parallel wires to the target wire, the determining including:

identifying a non-parallel return path for current from the target wire that forms a loop through the circuit design over one or more of the non-parallel wires;

calculating, using at least the processor, a capacitance value for the non-parallel return path; and calculating, using at least the processor, an estimated inductance value for the non-parallel return path by determining an inductance value at an infinite frequency based at least on the capacitance value for the non-parallel return path and scaling the inductance value at infinite frequency, wherein the infinite frequency is a frequency value where an impact of resistance on impedance becomes insignificant;

generating, using at least the processor, a circuit model of the target wire that includes the loop inductance and the loop capacitance for each of the parallel return paths combined with the capacitance value for the non-parallel return path and the estimated inductance value from the non-parallel return path.

8. The non-transitory computer-readable medium of claim 7, wherein scaling the inductance value at the infinite frequency comprises multiplying the inductance value at the infinite frequency for the non-parallel return path by a scaling factor.

9. The non-transitory computer-readable medium of claim 7, wherein determining nearby wires that are non-parallel wires to the target wire comprises identifying wires that are orthogonal to the target wire.

10. The non-transitory computer-readable medium of claim 7, wherein the target wire is a global clock wire.

11. The non-transitory computer-readable medium of claim 7, further comprising determining a scaling factor for scaling the inductance value at the infinite frequency for the non-parallel return path, wherein the scaling factor is based on comparing inductance values for return paths for at least two frequencies.

12. A computing system, comprising:
a processor and a memory;
a non-transitory computer-readable medium storing computer-executable instructions that when executed cause the processor to perform a method, the method comprising:

for a target wire in a circuit design that comprises a plurality of wires:

determining, using at least the processor, nearby wires that are parallel wires to the target wire in the circuit design, the determining including:

calculating, using at least the processor, a first inductance value for the parallel wires;

calculating, using at least the processor, a first capacitance value for the parallel wires;

identifying non-parallel wires to the target wire and including:

calculating, using the processor, a second capacitance value for the non-parallel wires;

calculating, using the processor, an estimated inductance value for the non-parallel wires based on the second capacitance value;

generating, using the processor, a circuit model for the target wire based at least in part by combining the first inductance value, the first capacitance value, the second capacitance value, and the estimated inductance value.

13. The computing system of claim 12, wherein the non-transitory computer-readable medium further comprises instructions for selecting the target wire that is a global clock wire.

14. The computing system of claim 12, wherein calculating the estimated inductance value for the non-parallel wires based on the second capacitance value comprises determining an inductance value at an infinite frequency based on at least the second capacitance value and multiplying the inductance value at infinite frequency with a scaling factor;

wherein the infinite frequency is a frequency value where an impact of resistance on impedance becomes insignificant.

15. The computing system of claim 12, wherein determining nearby wires that are parallel wires further includes stored instructions for:

identifying one or more return paths for current from the target wire that forms a loop through the circuit design;

calculating loop inductance and loop capacitance for each of the one or more return paths; and wherein generating the circuit model for the target wire comprises:

generating a resistance-inductance-capacitance (RLC) model of the target wire that includes the loop inductance and the loop capacitance for each of the return paths combined with the second capacitance value and the estimated inductance value from the non-parallel wires.

16. The computing system of claim 12, wherein the non-transitory computer-readable medium further comprises instructions for:

identifying one or more return paths for current from the target wire that forms a loop through the circuit design;

calculating a loop inductance value for each return path at a first frequency that is based on an operating frequency of the target wire and at a second frequency, wherein the second frequency is a frequency value where an impact of resistance on impedance is insignificant;

generating scaling factors between the loop inductance values at the first frequency and the loop inductance values at the second frequency; and storing the scaling factors in a storage device.

* * * * *

UNITED STATES PATENT AND TRADEMARK OFFICE
CERTIFICATE OF CORRECTION

PATENT NO.       : 8,799,842 B2                                   Page 1 of 1
APPLICATION NO.  : 13/608012
DATED            : August 5, 2014
INVENTOR(S)      : Tutuianu et al.

It is certified that error appears in the above-identified patent and that said Letters Patent is hereby corrected as shown below:

In the Specification

In column 2, lines 49-54, delete "Propagation along long ............... target wire." and insert the same on Col. 2, Line 48 after "time." as a continuation of the same paragraph.

In column 6, line 54, delete "1.00156-10H" and insert -- 1.0015e-10H --, therefor.

In column 6, line 56, delete "1.24016-10H" and insert -- 1.2401e-10H --, therefor.

In column 8, line 3, delete "$L_{line} \cdot C_{line} = \epsilon_0 \cdot \epsilon_r \cdot \epsilon \mu_0 \cdot d^2$" and insert -- $L_{line} \cdot C_{line} = \epsilon_0 \cdot \epsilon_r \cdot \mu_0 \cdot d^2$ --, therefor.

Signed and Sealed this
Tenth Day of March, 2015

Michelle K. Lee
*Deputy Director of the United States Patent and Trademark Office*